(12) United States Patent
Langner et al.

(10) Patent No.: US 7,626,515 B1
(45) Date of Patent: *Dec. 1, 2009

(54) COCKPIT INSTRUMENT PANEL SYSTEMS AND METHODS WITH VARIABLE PERSPECTIVE FLIGHT DISPLAY

(75) Inventors: Dale R. Langner, Olathe, KS (US); Philip I. Straub, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 770 days.

This patent is subject to a terminal disclaimer.

(21) Appl. No.: 10/986,336

(22) Filed: Nov. 10, 2004

Related U.S. Application Data

(63) Continuation of application No. 10/086,573, filed on Feb. 28, 2002, now Pat. No. 6,867,711.

(51) Int. Cl.
*G01C 21/00* (2006.01)
(52) U.S. Cl. .......... 340/971; 340/979; 340/973
(58) Field of Classification Search .......... 340/971, 340/973–979; 434/35, 38, 49, 51; 701/14, 701/45
See application file for complete search history.

(56) References Cited

U.S. PATENT DOCUMENTS

| | | | |
|---|---|---|---|
| 4,598,292 A | 7/1986 | Devino | 340/973 |
| 4,651,282 A | 3/1987 | Robinson et al. | 455/158.2 |
| 4,845,495 A | 7/1989 | Bollard et al. | 340/973 |
| 4,959,719 A | 9/1990 | Strubbe et al. | 358/183 |
| 5,136,301 A * | 8/1992 | Bechtold et al. | 342/176 |
| 5,475,594 A | 12/1995 | Oder et al. | 701/14 |
| 5,528,248 A | 6/1996 | Steiner et al. | 342/357 |
| 5,782,805 A | 7/1998 | Meinzer et al. | 604/131 |
| 5,883,586 A | 3/1999 | Tran et al. | 340/945 |
| 6,057,786 A | 5/2000 | Briffe et al. | 340/975 |
| 6,112,141 A | 8/2000 | Briffe et al. | 701/14 |
| 6,279,017 B1 | 8/2001 | Walker | 707/529 |
| 6,285,298 B1 | 9/2001 | Gordon | 340/945 |
| 6,314,343 B1 | 11/2001 | Adams et al. | 701/3 |
| 6,381,519 B1 | 4/2002 | Snyder | 701/3 |
| 6,466,235 B1 * | 10/2002 | Smith et al. | 715/771 |
| 6,473,675 B2 | 10/2002 | Sample | 701/3 |
| 6,614,419 B1 | 9/2003 | May | 345/156 |
| 6,690,298 B1 | 2/2004 | Barber et al. | 340/971 |
| 6,842,122 B1 | 1/2005 | Langner et al. | 340/945 |
| 6,892,135 B1 | 5/2005 | Krull et al. | 701/211 |
| 6,995,690 B1 * | 2/2006 | Chen et al. | 340/974 |
| 7,268,702 B2 * | 9/2007 | Chamas et al. | 340/975 |
| 2003/0132860 A1 | 7/2003 | Feyereisen et al. | 340/973 |

OTHER PUBLICATIONS

Manual: Pilot's Guide - RMS 555 Bendix/King Radio Management System, AlliedSignal Aerospace, Copyright 1993, AlliedSignal, Inc., Olathe, Kansas, Mar. 1, 1993, 52 pages.

\* cited by examiner

*Primary Examiner*—Jennifer Mehmood
(74) *Attorney, Agent, or Firm*—Samuel M. Korte

(57) ABSTRACT

Systems and methods are provided for integrated control, access, and customizable presentation of navigation related, flight information data on a multifunction display (MFD) within a cockpit. The MFD includes a bezel having controls located thereon which are adapted for controlling display formats, communication devices, navigational devices, and equipment sensors. A display is located adjacent to the bezel. The display is adapted to include at least one display region having navigation related data. At least one of the controls is operable to variably select a display format for the at least one display region.

22 Claims, 9 Drawing Sheets

COCKPIT INSTRUMENT PANEL SYSTEMS AND METHODS WITH VARIABLE PERSPECTIVE FLIGHT DISPLAY

CROSS REFERENCE TO RELATED APPLICATIONS

The present application is a continuation application of U.S. patent application Ser. No. 10/086,573, filed Feb. 28, 2002 now U.S. Pat. No. 6,867,711.

This application is related to the following co-pending, commonly assigned U.S. patent applications: "Cockpit Instrument Systems and Methods of Presenting Cockpit Instrument Data", Ser. No. 10/086,951, now U.S. Pat. No. 6,696,980; "Cockpit Control Systems and Methods of Controlling Data on Multiple Cockpit Instrument Panels", Ser. No. 10/086,929; "Cockpit Display Systems and Methods of Presenting Data on Cockpit Displays", Ser. No. 10/986,598; "Cockpit Control Systems and Methods with Redundant Flight Data Display", U.S. Ser. No. 10/086,783; and "Customizable Cockpit Display Systems and Methods of Customizing the Presentation of Cockpit Data", Ser. No. 10/086,996, each of which is by the same inventors and of which the disclosure is herein incorporated by reference in its entirety.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the screen layouts, and data as described below and in the drawings hereto: Copyright © 2001, Garmin Corporation., All Rights Reserved.

FIELD OF THE INVENTION

The present invention relates generally to cockpit instrument panel systems and methods of presenting cockpit instrument data. In particular, the present invention is directed to cockpit instrument panel systems and methods with variable perspective flight display.

BACKGROUND OF THE INVENTION

Modern commercial/private aircraft, as well as older aircraft, includes a myriad of instrumentation panels having controls and displays used to present information related to the controls. The controls and the displays are operated, viewed, and interpreted by a pilot during flight or an aircraft. Examples of the controls and displays employed by a pilot in piloting the aircraft include an altimeter, and airspeed indicator, a horizontal situation indicator, an attitude indicator, and the like. Other controls are used to permit radio communication with other pilots is the air or with air traffic controllers during flight. Still more controls are used to assist in navigation. In recent years these controls include controls form Global Positioning Systems (GPS) associated with satellite technology. Furthermore, transponder controls permit the aircraft to be uniquely identified and the aircraft's altitude communicated to air traffic controllers during flight.

For a neophyte, the quantity of controls, inputs, and display panels contained within the cockpit of an aircraft are daunting. Even experienced pilots/co-pilots within the cockpit of an aircraft are daunting. Even experienced pilots/co-pilots must stay focused to interpret information presented on various displays throughout the cockpit and often must switch between the use of alternate hands during flight to access various controls and control inputs within the cockpit. As a result, pilots/co-pilots must continually scan a plurality of available displays for vital information at any particular moment in time during flight.

Conventionally, data associated with control devices, control inputs, and other instruments within the cockpit is distributed throughout the cockpit and presented on a number of displays. The various data is presented as static or conventional views within the displays. The provided views are generally not modifiable by the pilot/co-pilot. Accordingly, existing data views and/or data formats must be learned by the pilots/co-pilots, and the views cannot be individually tailored to increase the comprehension of the pilot/user, based on any preferences of the pilot/co-pilot.

In recent years, multifunction displays (MFDs) have been developed for use within the cockpit of an aircraft. Such MFDs generally contain a single display screen which provides flight data and other information associated with select aircraft instruments or input controls. Often, however, the select aircraft input controls are not integrated into a bezel surrounding the MFD, and sometimes such input controls are not even located in near proximity to the MFD. And, some MFDs only provide data associated with those select aircraft input controls. Correspondingly, the pilot/user still must manage a myriad of displays, controls, and control inputs located at various locations throughout the cockpit. Additionally, data presented within any one display is not necessarily well organized and structured to provide a meaningful integrated presentation to the pilot/co-pilot. In other words, within a single MFD related flight information data may not be logically grouped within like regions on the display, such that a single glance at the display would provide the pilot/co-pilot with all the desired data at any desired moment.

Moreover, existing displays do not permit views, within the display, to include useful overlays or graphical display insets of additional relevant data. For example, a graphical view of an aircraft depicting the aircraft as it travels along a planned route toward a destination, generally does not permit the same graphical view to be overlaid with weather conditions occurring along the planned route, terrain conditions present along the planned route, and/or traffic conditions occurring along the planned route relative to other aircraft flying in close proximity to the planned route. And, even if some overlaid view or graphical display inset is permitted, existing views do not allow the perspective of that view to be altered. For example, a pilot/co-pilot cannot view the aircraft as it travels along the planned route from a top-down perspective, a bottom-up perspective, a birds-eye perspective, and the like. Accordingly, the pilot/co-pilot is forced to accept the perspective provided with the view.

To further emphasize the problems associated with providing customization with existing MFDs, consider that conventional MFDs are not easily expanded to include additional functionality as a pilot/user desires. As a result, MFDs are not flexible and any modifications that require additional functionality, to support expanded display (e.g., view) integration features, requires expensive design modifications to the control inputs, the control devices, and the software driving the presentation of data on the MFDs. As a result, there is very little customization which occurs within the MFD industry, and correspondingly pilots/users have learned to accept and use whatever features are provided with the MFDs by the manufactures.

As is apparent to one skilled in the art, existing cockpit control systems and cockpit instrument displays do not provide seamless integration with respect to communication controls, navigational controls, and equipment controls or instruments, or for the instrument displays which present data views associated with these controls and instruments. As a result, the pilot/user is forced to visually or manually switch to alternate instrument displays and various regions within a single display to acquire desired information. Consequently, the pilot/user is often forced to view scattered, multiple instrument displays to obtain all the relevant flight information data associated with the controls or instruments. And, the scattered, multiple instrument display each present data in varying size, formats, and perspectives which require some degree of mental acclamation or adjustment to interpret.

Therefore, there exits a need for better customization and integration of cockpit display systems and instrument panels within the cockpit, which permit the pilot/user to more rapidly acquire, process, and control flight information data within the display. Moreover, there exists a need for better customization and presentation of flight information data within cockpit displays.

SUMMARY OF THE INVENTION

The above mentioned problems related to customization and presentation of flight information data within cockpit displays, as well as other problems, are addressed by the present invention and will be understood by reading and studying the following specification. Systems and methods are provided for cockpit instrument panels and cockpit data presentation which provide better customization and more efficient presentation of flight information data within cockpit displays. The systems and methods of the present invention offer improved cockpit instrument panels which provide more integrated, user-intuitive, and efficient access to customizable, navigation related, flight information data.

In one embodiment of the present invention, a cockpit instrument system is provided which affords a customizable presentation of navigation related, flight information data on a multifunction display (MFD). The MFD includes a bezel having controls located thereon which are adapted for controlling display formats, communication devices, navigational devices, and equipment sensors. A display is located adjacent to the bezel. The display is adapted to include at least one display region having navigation related data. At least one of the controls is operable to variably select a display format for the at least one display region. According to the teachings of the present invention, a first and a second display format, having the same or different vantage points or views for navigation related, flight information data are provided simultaneously on display. For example, a first display format for navigation related, flight information can be provided in a primary display area of display and a second display format for navigation related, flight information data begin provided as a display inset thereon. According to various embodiments of the present invention, a geographical data presentation fills the entire display and a partial compass rose or a full horizontal situation indicator is selectably, directly overlaid on the geographical data presentation.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION OF THE INVENTION

Figure 1A:
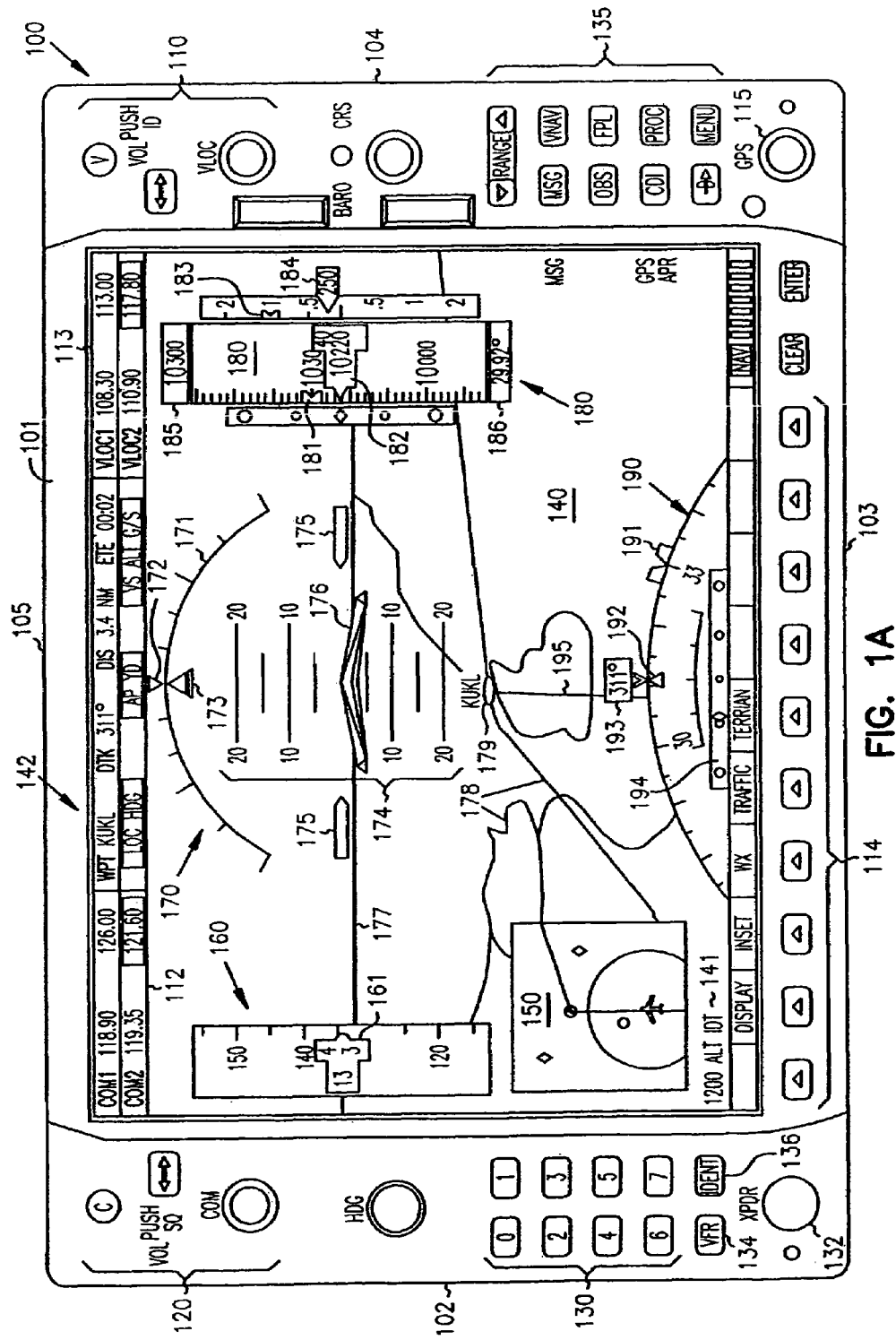
FIGS. 1A-1D illustrate a number of variably configurable cockpit instrument panel, such as a primary flight display, according to the teachings of the present invention.

In the following detailed description of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is, therefore, not to be taken in a limiting sense, and the scope of the present invention is defined only by the appended claims, along with the full scope of equivalents to which such claims are entitled.

In the present invention, improved multifunction displays (MFDs) are provided. As used herein, a MFD is used broadly to include graphical user interface based (GUI-based) displays with integrated presentation data presented thereon using a variety of views. The views are configured on the MFDs to provide ready access to flight information data. In some embodiments of the present invention the use of the term MFD is employed in connection with or to refer to a primary flight display (PFD). In some embodiments of the present invention the use of the term MFD is employed in connection with or to refer to a navigation display (NAV display). Additionally, in some embodiments, multiple MFDs are included such that a first MFD is principally used as a PFD and a second MFD is principally used as a NAV display. In such embodiments, the second MFD or NAV displays is in compliment to the PFD. In the present invention, multiple MFDs can be stacked one upon the other, or alternatively arranged side by side. Further, in some embodiments an MFD is adapted to include audio capabilities. As one of ordinary skill in the art will appreciate upon reading this disclosure, the flight information data which is presented on such MFDs can differ based on the aircraft type, e.g. frame and engine type.

In the invention, a "bezel" is provided as part of the MFDs. Typically, the bezel is the framed perimeter that surrounds a display, but is not part of the display itself. Further as used in this application, control data and instrumentation data, including flight information data, refer to data received by controls coupled to input devices, such as communication and navigational input devices, and data received from various equipment and sensors, such as the aircraft engine, fuel, airspeed, altitude and attitude sensors. For example, navigational and communication controls tune navigational devices (e.g., VLOC receives, radios, and the like) within the aircraft and permit software operating on a processing device to receive and process the communication and navigational data collected by such devices. Equipment and sensor instrumentation facilitate the presentation of data relating to such parameters as aircraft engine, fuel, airspeed, altitude and attitude status.

In the present invention, this data can be operated on by software to generate one or more dynamic images on the GUI of a MFD display. As one of ordinary skill in the art will understand upon reading this disclosure, the display is capable of presenting text or graphical information. In some embodiments, the display of provides image or video data. In one example, the GUI depicts a present movement, path and/or projected destination of an aircraft relative to locations on the ground along with airspeed, altitude, attitude and engine status data. As one skilled in the art will appreciate, input devices such as communication and navigation controls include settings such as a current radio frequency, channel, and the like.

Although specific cockpit controls and particular flight information data are described herein, these descriptions are presented by way of example only and are not intended to limit the scope of the present invention. As one of ordinary skill in the art will understand upon reading this disclosure, any existing or customized controls and flight information data are readily integrated with one or more multifunction displays (MFDs) according to the teachings of the present invention. And, any combination and arrangement of the MFDs and the flight information data presented thereon are intended to fall within the scope of the present invention. According to the teachings of the present invention, flight information data is available at all times. As one of ordinary skill in the art will understand upon reading this disclosure, the MFDs are positioned within the cockpit so that a pilot can view and access communication and navigation controls proximately located to the MFDs at all times during flight.

FIG. 1A illustrates one embodiment of an improved multifunction display (MFD) 100 according to the teachings of the present invention. The MFD 100, as shown in FIG. 1A, can be incorporated in a cockpit instrument panel. The MFD 100 includes a bezel 101. In the embodiment shown in FIG. 1A, the bezel 101 provides a framed perimeter that surrounds a GUI display 140. Thus, the bezel 101 has four sides namely, a left side 102, a bottom side 103, a right side 104, and a top side 105. As shown in the embodiment of FIG. 1A, the bezel 101 includes a number of aircraft instrument and/or input controls. As shown of ordinary skill in the art will understand upon reading this disclosure, flight information data and other information associated with these aircraft instrument and/or input controls are provided on display 140. Thus, in the invention, the aircraft instrument and/or input controls are proximately located to where information related to same are displayed.

In the embodiment of FIG. 1A, the MFD 100 is employed as a PFD 100. As shown in FIG. 1A, the bezel 101 has affixed thereon navigational input controls 110 permitting control over the VOR/Localize receiver. As used herein VOR refers to VHF Omnidirectional radio range. In the embodiment of FIG. 1A, navigation input control 110 is labeled VLOC as the acronym for the VOR/Localize receiver. In FIG. 1A, the bezel has affixed thereon communication input controls, shown as COM 120, permitting radio communications with air traffic controllers and/or other pilots in the air. Further in the embodiment of FIG. 1A, the bezel 101 has affixed thereon additional input controls including; transponder input controls such as numeric touch pad 130, XPDR mode control 132, IDENT control 136, and VFR squawk code entry 134.

As will be understood by one or ordinary skill in the art upon reading this disclosure, the additional controls, 130, 132, 134, and 136, are one embodiment of the additional controls which can be included on bezel 101. However, the invention is not so limited. By way of example, and not by way of limitation, additional input controls such as GPS controls 115 and autopilot controls 135 are included in the scope of the present invention. All of the above described controls are adapted to or operable to manipulate the presentation of flight information data on display 140. For example, the pilot can use the numeric touch pad 130 to enter a unique squawk code required by the air traffic controllers to identify the pilot's aircraft. In FIG. 1A, the text string "1200 ALT IDT" 141 presented on the display 140 includes the aircraft's transponder identity information. The IDENT 136 control permits the aircraft to uniquely be identified on an air traffic controller's display when requested. For example, if requested the pilot presses the IDENT 136 control and the pilot's aircraft will be uniquely identified on the air traffic controller's display. Further, the XPDR 132 control can change modes or a push action can switch between XPDR 1 and XPDR 2 in order to activate and/or deactivate particular transponder communications.

Further, in some embodiments text massaging controls or video telecommunication controls are affixed on the bezel 101. In one such embodiment, the numeric touch pad 130 includes alpha characters and/or symbol characters on each touch pad along with the numeric depicted in FIG. 1A. As one skilled in the art will appreciate, this permits a pilot to send and receive text messages from other pilots, the Internet, authorities, air traffic controllers, or other electronically interfaced sources. Further video controls, in some embodiments, permit the pilot to view the cabin of the aircraft for disturbances or for the air traffic controllers to view different locations within the cockpit and/or cabin of the aircraft.

According to the teachings of the present invention, additional control affixed to the bezel 101, permit increased integration within the cockpit and provide customized presentations of flight information data on display 140 of MFD 100. For example, overlay controls 114 located on the bottom side 103 of the bezel 101, permit the pilot to adjust the main display 140 by overlaying graphical data related to weather, traffic, and terrain. As used in this application, the overlay controls are sometimes referred to as "softkeys" 114. In FIG. 1A, text is provided on the display 140 above the softkeys 114 to identify their respective functionality. This is demonstrated in the embodiment of FIG. 1A with text labels such as TRAFFIC, TERRAIN, and WX (for weather), for example. Further in some embodiments, the display 140 can be customized, such as by using or actuating one or more of the softkeys 114 to crate one or more graphical display insets, e.g. inset display 150, within the display 140. In the embodiment of FIG. 1A, a softkey 114 for actuating such functionality has a text label INSET provided above that softkey on the display 140.

In the embodiment of FIG. 1A, flight information data and/or control setting is displayed horizontally as a data strip 142 across a top portion of the display 140. For example, within data strip 142, communication control settings are shown in a first region 112 (COM1, COM2) and navigation control settings are shown in a second region 113 (VLOC 1, VLOC 2). Further, within data strip 142, additional flight information data such as a flight plan waypoint (WPT KUKL), desired track (DTK), distance (DIS) to a flight plan waypoint, estimated time enroute (ETE), and a number of other annunciators (LOC HDG, APYD, and VS ALT G/S) are provided.

Communication input controls, shown as COM 120 in FIG. 1A, manipulate the communication settings to change the frequency or channel data, and the like. Navigation input controls, shown as VLOC 110 in FIG. 1A, manipulate the navigation settings to change the frequency or channel data, and the like. Transponder (XPDR) mode control, shown as XPDR 132 in FIG. 1A, can change modes or a push action can switch between XPDR 1 and XPDR 2 in order to activate and/or deactivate particular transponder communications. Thus, as stated above, the aircraft instrument and/or input controls are proximately located to where information related to same are displayed.

According to the teachings of the present invention, the display 140 of the PFD 100 can further include one or more inset displays, such as display inset 150, as well as a number of graphical information overlays, 160, 170, 180 and 190. The display inset 150 and graphical information overlays, 160, 170, 180 and 190, provide additional flight information data on display 140. As shown in the embodiment of FIG. 1A, graphical information overlays, 160, 170, 180 and 190, include indicators for airspeed 160, attitude 170, altitude 180, and heading 190. In the embodiment shown in FIG. 1A, inset 150 illustrated a top down navigational view.

In the embodiment shown in FIG. 1A, an inset 161 within airspeed indicator 160 provides an aircraft's actual airspeed at a particular moment in time. In FIG. 1A, inset (or screen graphic/overlay) 170 presents the aircraft's attitude data. Attitude indicator 170 includes a pitch and roll scale 171 for the aircraft. In FIG. 1A, the pitch and roll scale 171 includes an arc 171 having a bank and a skid indicator, shown as two reference arrows, 172 and 173. In the embodiment of FIG. 1A, the top arrow 172 indicates the current degree of bank or roll of the aircraft as measured by the arrows location relative to the arc 171. The bottom arrow 173 is a slip skid indicator 173 which illustrates whether the aircraft is additionally slipping or skidding within a degree of roll, e.g. such as may occur in a banking turn of the aircraft. Thus, in the embodiment of FIG. 1A, the attitude indicator 170 represents that the aircraft is flying level, e.g. no roll indicated by arrow 172's position on the arc 171, and accordingly is not experiencing any slip or skid as indicated by arrow 173's position on the arc 171.

Attitude indicator 170 further illustrates a pitch indicator shown as a scale 174. The scale 174 indicated the angle, or pitch, of the plane whether it is angled upward in a climb, downward in a dive, or level with the ground. In the embodiment shown in FIG. 1A, the pitch scale 174 indicates that the aircraft is currently flying level with the ground.

Attitude indicator 170, in the embodiment of FIG. 1A, also illustrate a number of markers, 175 and 176. In the embodiment of FIG. 1A, markers 175 represent the aircraft's wingtips and marker 176 represents the aircraft'a nose. Thus, in one embodiment the aircraft's wingtip markers 175 and nose marker 176 are useful in interpreting the aircraft's pitch and roll data in conjunction with and relative to the pitch scale 174, roll arc 171, and bank and slip/skid arrows, 172 and 173 respectively.

In one embodiment according to the teachings of the present invention and as shown in the embodiment of FIG. 1A, attitude indicator 170 is provided in a primary display region on display 140. As used herein, primary display region is intended to mean the central portion of display 140. As shown in FIG. 1A, attitude indicator 170 occupies the largest portion of display 140. In embodiment of FIG. 1A, attitude indicator 170 is presented together with navigation related, flight information data, also displayed in the primary display region of display 140. As shown in the embodiment of FIG. 1A, the navigation related, flight information data illustrates a number of geographical features such as a horizon line 177, reservoirs and roadways 178, and a flight plan waypoint (KUKL) 179.

Figure 1B:
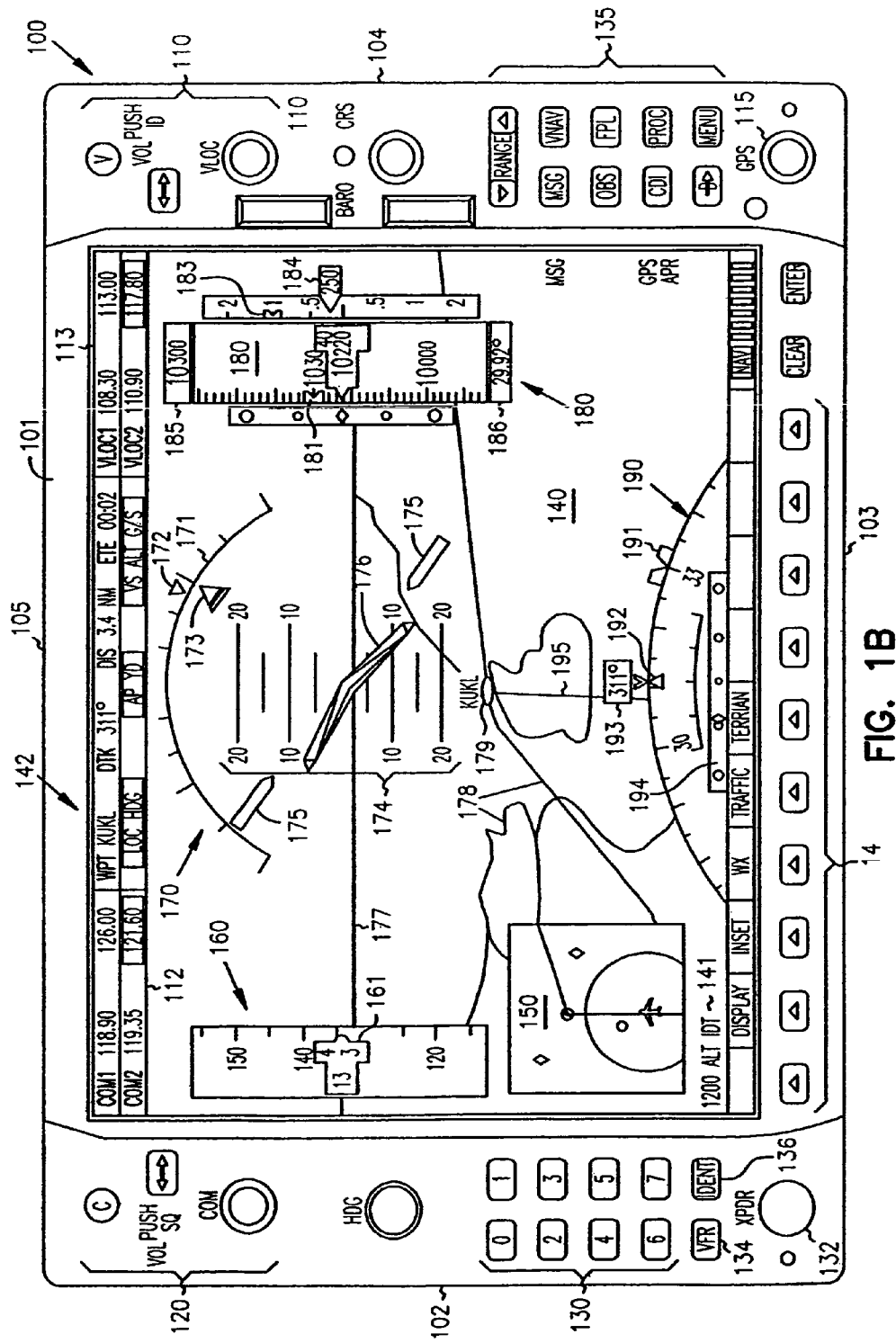

FIG. 1B illustrates another configurable presentation of flight information data on PFD 100, according to the teachings of the present invention. In the embodiment shown in FIG. 1B, the aircraft's wingtip markers 175 and nose marker 176 move relative to the horizon line 177 and other geographical features, e.g. 178 and 179, while the horizon line 177 is maintained in a fixed parallel orientation with the top of the bezel 105. Thus the aircraft's wingtip markers 175 and nose marker 176 will dynamically move relative to the horizon line 177 and other geographical features, e.g. 178 and 179, depending on the aircraft's pitch and roll. As one of ordinary skill in the art will understand upon reading this disclosure, the horizon line 177 demarcates a division between the ground or earth and the sky from a perspective viewed from within the cockpit. Accordingly, in the invention, when the aircraft is in a dive the horizon line 177 will dynamically move upward to show less of the sky, and can move entirely off the top of the screen in a steep enough dive such that the horizon line 177 is no longer provided on the display. Similarly, when the aircraft is in a climb the horizon line 177 will dynamically move downward to show less of the ground or earth, and can move entirely off the bottom of the screen in a steep enough climb such that the horizon line 177 is no longer provided on the display. As one of ordinary skill in the art will understand upon reading this disclosure, the motion and dynamic movement of the aircraft's wingtip markers 175 and nose marker 176 relative to the fixed horizontally display orientation of the horizon line 177 and other geographical features, e.g. 178 and 179, provides useful information for interpreting the aircraft's pitch, roll, and dive or climb status.

Figure 1C:
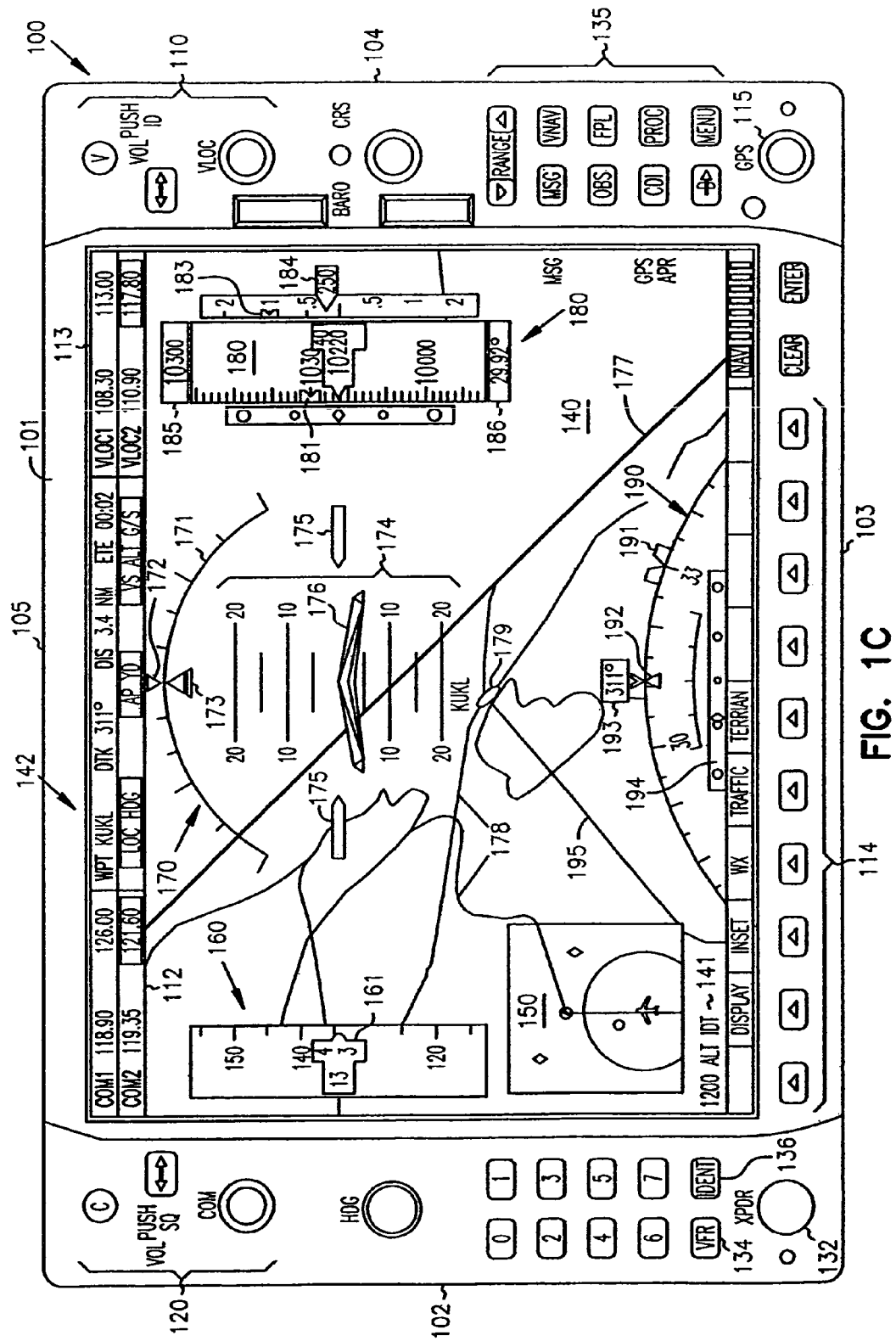

FIG. 1C illustrates another alternatively configurable presentation of flight information data on PFD 100, according to the teachings of the present invention. In the embodiment shown in FIG. 1C, the aircraft's wingtip markers 175 and nose marker 176 are maintained in a fixed parallel orientation with the top of the bezel 105 and the horizon line 177 and other geographical features, e.g. 178 and 179, dynamically move in relation to aircraft's wingtip markers 175 and nose marker 176. In this embodiment, the horizon line 177 and other geographical features, e.g. 178 and 179, dynamically move depending on the aircraft's pitch, roll, and dive or climb status. Accordingly, in the invention, when the aircraft is in a roll the horizon line 177 will dynamically move rotationally, vertically, and horizontally, and can move entirely off of the screen in any direction relative to the aircraft's pitch and roll. As one of ordinary skill in the art will understand upon reading this disclosure, the motion and dynamic movement of the horizon line 177 and other geographical features, e.g. 178 and 179 relative to the fixed horizontally display orientation of the aircraft's wingtip markers 175 and nose marker 176, provides useful information for interpreting the aircraft's pitch, roll, and dive or climb status.

Accordingly to the teachings of the present invention, the display of the navigation related, flight information data which is displayed in the primary display region of display 140 is dynamically configurable. That is, as shown in the embodiment of FIG. 1B, the display of the navigation related, flight information data which is displayed in the primary display region of display 140 can be operably selected to provide a display showing the dynamic motion of the aircraft's wingtip markers 175 and nose marker 176 relative to the horizon line 177 and other geographical features, e.g. 178 and 179, while the horizon line 177 is maintained in a fixed parallel orientation with the to of the bezel 105. Alternatively, as shown in the embodiment of FIG. 1C, the display of the navigation related, flight information data, which is displayed in the primary display region of display 140, can be operably selected to provide a display showing the aircraft's wingtip markers 175 and nose marker 176 maintained in a fixed parallel orientation with the top of the bezel 105 and in which the horizon line 177 and other geographical features, e.g. 178 and 179, dynamically move in relation to aircraft's wingtip markers 175 and nose marker 176.

According to the teachings of the present invention, the embodiment shown in FIG. 1A provides navigation related, flight information data which is displayed in the primary display region of display 140 according to a cockpit view, or perspective, display convention. And additionally, a top down navigational inset 150, including navigational features such as cities and other geographical features, is provided within the display 140. As one of ordinary skill in the art will understand upon reading this disclosure, the navigation related, flight information data which is displayed in the primary display region of display 140 according to a cockpit view, or perspective, display convention and the top down navigational inset 150 compliment one another and afford an enhanced overall presentation of navigation related, flight information data.

As one of ordinary skill in the art will appreciate according to the teachings of the present invention, the embodiment of the display of the navigation related, flight information data shown in the primary display region of display 140 is further dynamically configurable to provide a display of navigation related, flight information data which is different from the cockpit view display illustrated in FIG. 1A. That is, in one embodiment the display formats for navigation related, flight information data shown in the primary display region of display 140 and that shown in inset 150 can be switched by using or actuating the overlay controls, or softkeys 114. Thus, the cockpit view display wold then appear in inset 150 and the top down navigational view would be provided to the primary display region of display 140. According to the teachings of the present invention and as will be appreciated from reading below, other navigation display formats are consider within the scope of the present invention. And, the several navigation display formats can be alternated between an inset 150 and a primary display region of the display 140. The invention is not so limited.

Referring again to FIG. 1A, altitude indicator 180 shows a scale which provides the aircraft's altitude data on the display 140 of PFD 100. The embodiment shown in FIG. 1A illustrates such explicit data as the aircraft's vertical assent and vertical velocity. In the embodiment of FIG. 1A, altitude indicator 180 includes an adjustable display marker 181 which represents a desired altitude for the aircraft. In FIG. 1A, this marker 181 is shown set at 10,300 feet. The horizontally oriented rectangular box at the top of the scale is another data indication 185 in this embodiment of the selected, desired altitude, e.g. 10,300 feet. Marker 182, in FIG. 1A, provides data on the aircraft's actual current altitude, e.g. 10,220 feet.

The vertically oriented rectangular box on the right margin of the scale provides data on both a desired rate of ascent, or decent, and data on the actual rate of ascent or descent. Thus, in the embodiment shown in FIG. 1A, a marker 183 is shown set at 1 (values measured in thousands) indicating a desired rate of climb to be 1,000 feet per minute. And, marker 184 is shown providing data for the aircraft's actual current rate of ascent to be 250 feet per minute. The horizontally oriented rectangular box at the bottom of the scale is a data representation in this embodiment of the aircraft's altimeter setting 186.

Heading indicator 190, in FIG. 1A, illustrates an arc heading indication 190. As one of ordinarily skill in the art will understand upon reading comprehending this disclosure, the arc is a partial compass rose 190 which presents data for the aircraft's course and heading. According to this embodiment of the present invention, a geographical data presentation fills the entire primary display region of display 140 and the partial compass rose 190 is directly overlaid on the geographical data presentation. Heading indicator 190, in the embodiment of FIG. 1A, includes an adjustable marker data display 191 which represents a desired compass heading for the aircraft. In FIG. 1A, this marker 191 is shown set at 33 (values measured in tens), or 330 degrees clockwise from due North. Marker 192, in FIG. 1A, provides data on the aircraft's actual track heading, e.g. 311 degrees clockwise from due North. In the embodiment of FIG. 1A, this track heading data is further displayed in a box 193 above the partial compass rose 190 and in the form of a horizontally oriented, course deviation indicator (CDI) 194.

FIG. 1A illustrates a course line 195 displayed above the partial compass rose 190 and leading to a flight plan waypoint, e.g. airport (KUKL) 179. However, marker 192 is illustrated offset from the course line 195. As one of ordinarily skill in the are will appreciate, the aircraft can be correctly moving along the course line to the desired destination while steering the nose of the aircraft in a direction slightly off from the course line 195. For example, in a strong wind the aircraft will have to direct its nose into the wind somewhat in order to actually track the courseline 195. Alternatively, in velocity vector based systems, the embodiment illustrated in FIG. 1A would actually have track marker positioned on the courseline 195. As one of ordinary skill in the art will appreciate upon reading this disclosure, the scope of the present invention is intended to include a velocity based system and in such systems the embodiment shown in FIG. 1A will adjust accordingly to illustrate track marker positioned on courseline 195.

Figure 1D:
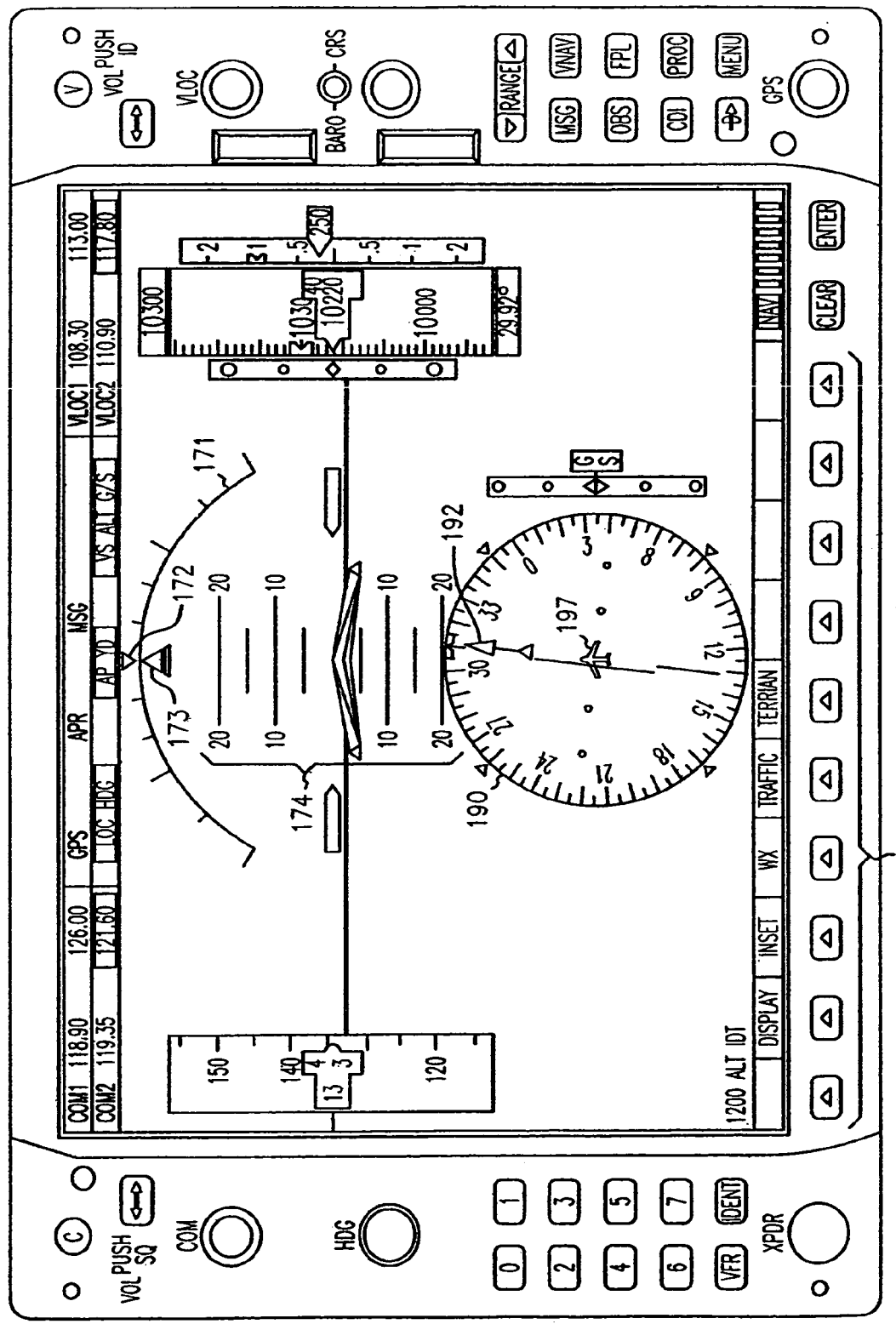

FIG. 1D illustrates another alternatively configurable presentations of flight information data on PFD 100, according to the teachings of the present invention. In the embodiment shown in FIG. 1D, another variable configuration for the heading indicator 190 is shown. That is, in the embodiment of FIG. 1D the heading indicator 190 is a full compass rose or horizontal situation indicator (HSI) 190. According to this embodiment of the present invention, a geographical data presentation fills the entire primary display region of display 140 and the horizontal situation indicator (HSI) 190 is directly overlaid on the geographical data presentation. In contrast to the perspective view of the partial compass rose or arc heading indicator in FIG. 1A, the HSI 190 in the embodiment of FIG. 1D provides a top down display format such that a full 360 degrees of the HSI, or compass rose is displayed over the cockpit perspective view format being displayed in the primary display region of the display 140. In this embodiment, a plane image 197 is centered within the full compass rose 190 and the nose of the plane is illustrated slightly off from the track marker 192. Again, this illustration takes into account that the aircraft can be accounting for a certain directional wind force.

FIGS. 1A-1D, are provided by way of example only, and one of ordinary skill in the art will understand, by reading and comprehending this disclosure, the manner in which the various arrows, markers and/or other indicators, e.g. the flight data indicators for airspeed, attitude, altitude, heading and the like, will dynamically change relative to the aircraft's status and/or position. The present invention provides an improved PFD 100 which integrates all of the flight information data therein.

As shown in FIG. 1A and according to the teachings of the present invention, a first and a second display format, having the same or different vantage points or views for navigation related, flight information data are provided simultaneously on display 140. For example, FIG. 1A illustrates a fist display format for navigation related, flight information being provided in the primary display area of display 140 and a second display format for navigation related, flight information data being provided as a display inset 150 thereon. Additionally, as shown in FIG. 1A, graphical information overlays, 160, 170, 180 and 190, provide additional flight information data on display 140. As shown in the embodiment of FIG. 1A, graphical information overlays, 160, 170, 180 and 190, include indicators for airspeed 160, attitude 170, altitude 180, and heading 190. According to various embodiments of the present invention, a geographical data presentation fills the entire primary display region of display 140 and a partial compass rose 190 (as shown in FIG. 1A) or a full horizontal situation indicator (as shown in FIG. 1D) is selectably, directly overlaid on the geographical data presentation. As one of ordinary skill in the art will understand upon reading this disclosure, the invention can include any number of a number of display insets such as display inset 150 and can include any number of graphical information overlays. The invention is not so limited.

Figure 2A:
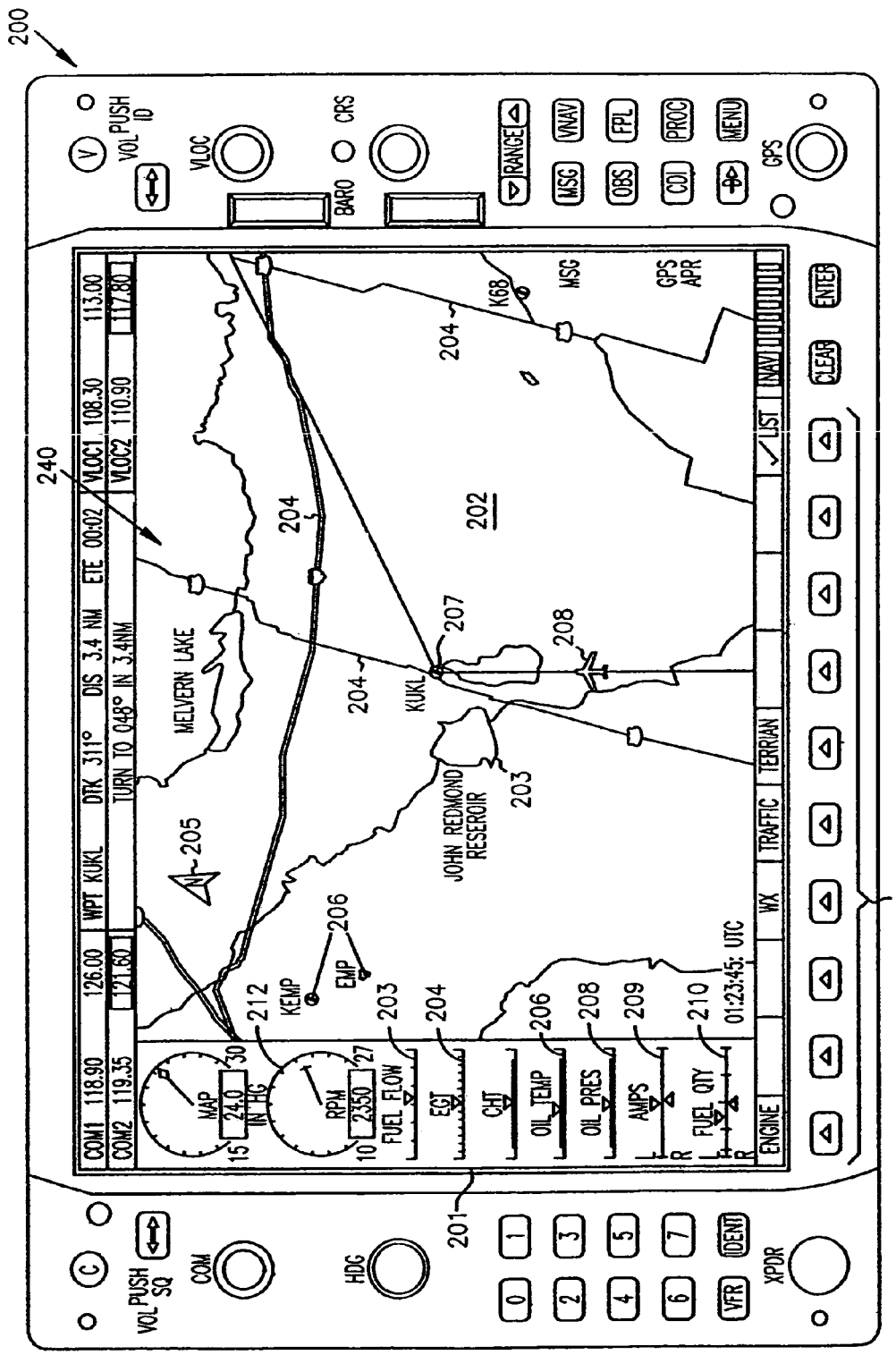
FIGS. 2A-2C are illustrations for a cockpit instrument panel, such as a second multi-functional display, according to the teachings of the present invention.
Figure 2B:
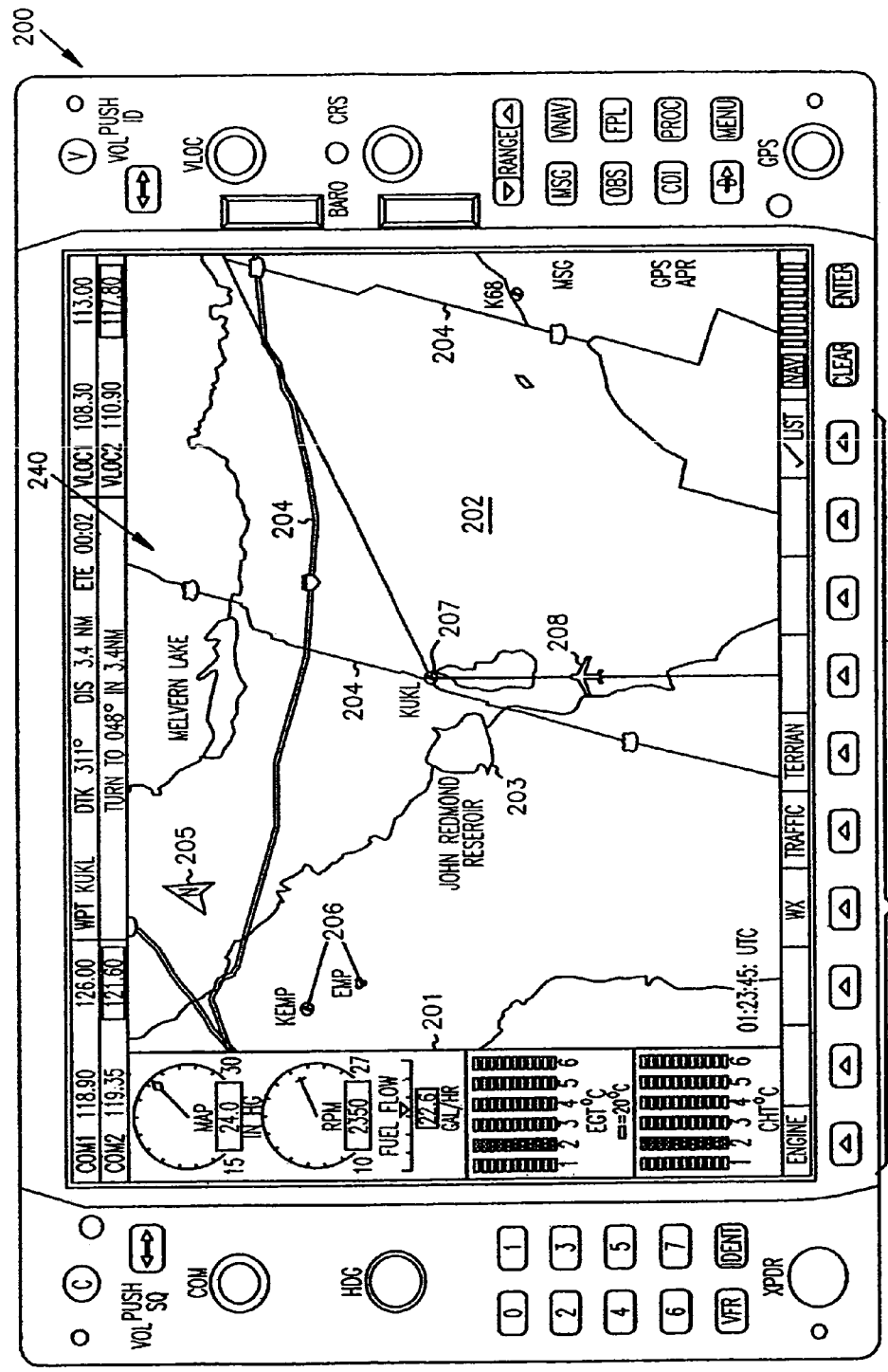
Figure 2C:
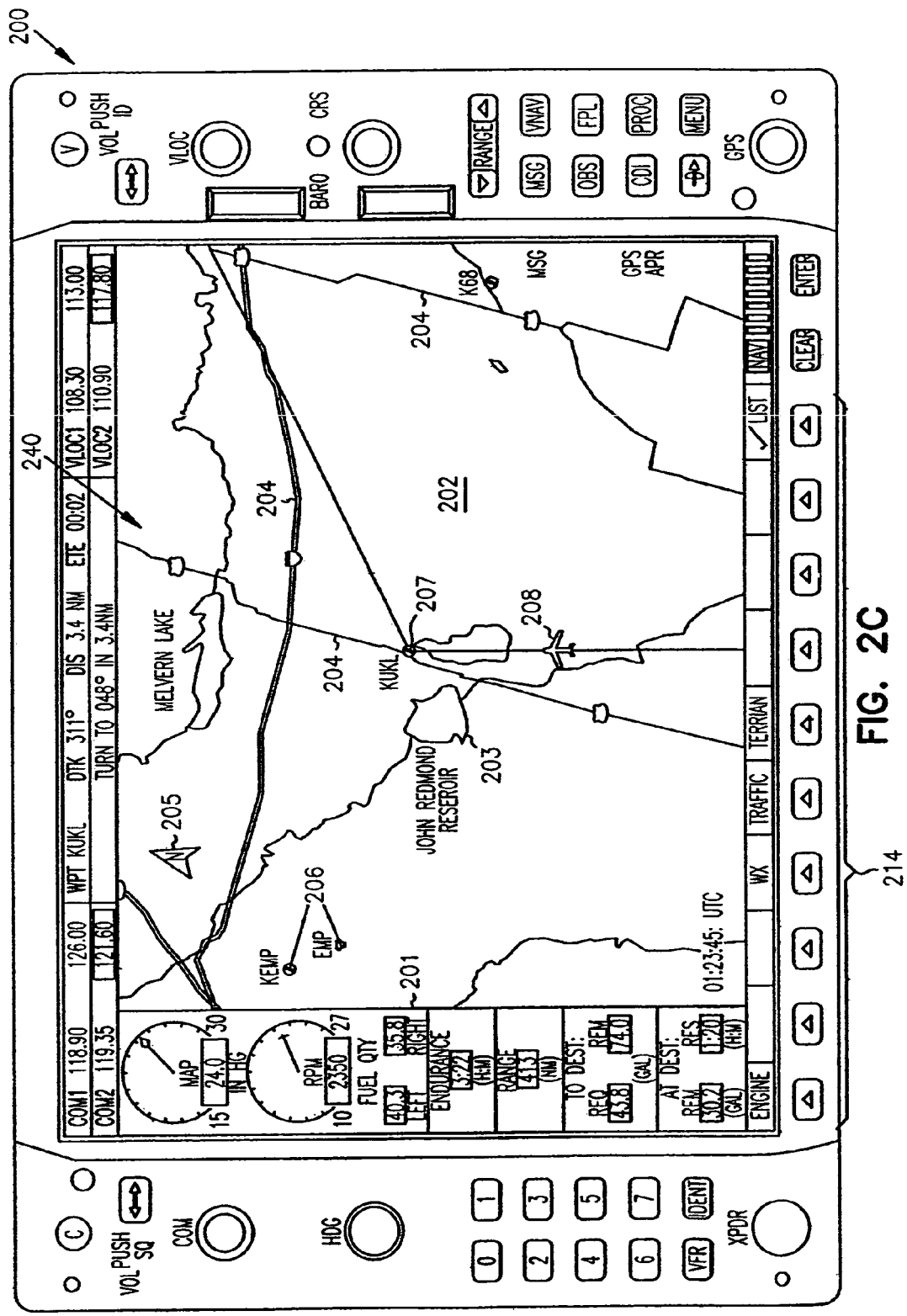

FIGS. 2A-2C provide illustrations for a cockpit instrument panel, such as a second multi-functional display, according to the teachings of the present invention. In FIG. 2A illustrates one variably configurable complementary multifunction display (MFD) 200, which can be employed in conjunction with the PFD 100 described in detail above in connection with FIG. 1A, according to the teachings of the present invention. As shown in FIG. 2A, the MFD 200 is a cockpit instrument panel 200. The MFD 200 shown in FIG. 2A includes all of the novel integration of bezel located controls, panel display, and proximate control devices which are provided in the PFD 100 of FIG. 1A. According to the teachings of the present invention, the MFD 200 of FIG. 2A illustrates a complementary display 240. Like the PFD or MFD 100 shown in FIG. 1A, the MFD 200 of FIG. 2A is a GUI enabled device capable of presenting test and graphical data/information, image, or video data. In some embodiments MFD 200 is adapted to include control of audio capabilities. In some embodiments MFD 200 is oriented side by side with the PFD 100 of FIG. 1A with a vertically oriented audio system situated between the two MFDs, 100 and 200 (shown in FIG. 3). Such a system configuration is illustrated and described in greater detail in copending application, by the same applicants, entitled "Cockpit Instrument Panel Systems and Methods of Presenting Cockpit Instrument Data," attorney docket no. 1528.014us1, and filed on even date herewith.

The complementary MFD 200, shown in the embodiment of FIG. 2A, illustrates the MFD 200 being utilized as navigational MFD. Thus, in one embodiment, as used herein, the MFD 200 of FIG. 2A is sometimes referred to as a NAV display 200. However, as will be understood by reading and comprehending this disclosure, the invention is not so limited. In the embodiment shown in FIG. 2A, the display 240 of MFD 200 illustrates engine data, shown at 201, and navigational data 202 presented from a viewpoint located above the actual aircraft. As one of ordinary skill in the art will further understand from reading and comprehending this disclosure, as well as those disclosures cross referenced above, the navigational data represented from a viewpoint located above the actual aircraft is one viewpoint embodiment from which such navigational data can be displayed on MFD 200. The invention is not so limited.

As described above in connection with FIG. 1A and according to the teachings of the present invention, the display format of navigation related, flight information data 202 presented on display 240 is dynamically configurable, such as by actuating softkeys 214, in order to switch from the top down navigational view illustrated in FIG. 2A to a cockpit perspective view (shown in FIG. 1A) or other navigational display perspective, e.g. a birds-eye perspective (a viewpoint from above and behind the actual aircraft). Likewise, in the invention the overlay controls 214 can be used to create or add additional navigation related, flight information data as display insets (e.g. 150 in FIG. 1A) and/or as graphical information overlays (e.g. 160, 170, 180 and 190 in FIG. 1A) on display 240. The invention is not so limited. According to the teachings of the present invention, the primary display region on display 240 and any display insets and/or graphical information overlays are independently or collectively configurable to display navigation related flight information data. In one embodiment, as shown in FIG. 2A, the navigation flight information data is presented in a two dimensional format. However the invention is not so limited and a three dimensional (3-D) format is considered within the scope of the present invention.

In the embodiment shown in FIG. 2A, the navigational data 202 portion of display 240 illustrates a number of geographical features such as a reservoir 203, a number of roadways 204, a North directional arrow marker 205, a number of aviation waypoints 206, a flight plan waypoint (KUKL) 207, and the aircrafts position relative to these features. However, as one of ordinary skill in the art will understand upon reading this disclosure, the invention is not limited to this particular number or choice of features. And, fewer or more features are included within the scope of the present invention.

In FIG. 2A, MFD 200 is illustrated providing complimentary flight information data to that discussed and illustrated above in connection with FIG. 1A. That is, as shown in FIG. 2A, engine data is displayed within a vertical column 201 on the display 240 of MFD 200. As one of ordinary skill in the art will appreciate, upon reading the present disclosure, the engine data displaced within a vertical column 201 on MFD 200 does not necessarily have to be displayed within a vertical column (as shown in FIG. 2A) and other presentations of this data, such as within a horizontal column are considered within the scope of the present invention. However, it is recognized that such engine data is flight information data and is desired for presentation in some configuration and/or format to the pilot of an aircraft.

In the embodiment shown in FIG. 2A, the engine data shown in vertical column 201 includes aircraft equipment data, such as fuel flow 203, engine temperature 204, oil temperature 206, oil pressure 208, fuel quantity 210, RPMS 212, electrical system amperage (AMPS) 209. The invention, however, is not limited to this configuration of the aircraft equipment data. In fact, according to the present invention, as described in the above cross referenced application, the actual arrangement of the data displayed in column 201 can be user configurable. Also, as one of ordinary skill in the art will appreciate in reading this disclosure, the engine data 201 which is provided to display 240 is dependent on, or based upon, a given aircraft frame and engine type.

In one embodiment, the engine parameters can be configured for at least three different data displays. As shown in vertical column 201 embodiment of FIG. 2A, data representing the above described, detailed engine parameters are displayed. However, as shown in the embodiment of FIG. 2B, the vertical column 201 can likewise be used to display engine data representing engine power management, shown as exhaust gas temperature (EGT ° C.) and cylinder head temperature (CHT ° C.) in vertical column 201, in order to regulate fine tuning of the engine power. Attentively, as shown in the embodiment of FIG. 2C, the vertical column 201 can likewise be used to display engine data representing fuel planning management. That is, as shown in the embodiment of FIG. 2C, vertical column 201 includes such engine data as fuel range, the current fuel burn rate, and or other so related parameters.

According to the teachings of the present invention, the complimentary MFDs, 100 and 200, are used to provide wide graphical data displays integrated in one central location with the controls and devices themselves. In the embodiments shown in FIGS. 1 and 2, a perspective, cockpit flight view is principally illustrated on the display 140 of PFD 100 in FIG. 1A and a top down view is principally illustrated in on the display 240 of NAV display 200 in FIG. 2A. In the embodiment of FIG. 1A, the cockpit flight view on display 140 includes a presentation of flight information data indicators such as airspeed 160, attitude 170, altitude 180, and heading 190. According to various embodiments of the present invention, a geographical data presentation fills the entire primary display region of display 140 and a partial compass rose 190 (as shown in FIG. 1A) or a full horizontal situation indicator (as shown in FIG. 1D) is selectably, directly overlaid on the geographical data presentation. Also, shown overlaid on the display 140 of PFD 100 is a navigational inset 150. In the embodiment of FIG. 2A, the top down view on display 240 includes flight information data relating to the aircraft's engine and shown in vertical column 201. One of ordinary skill in the art will understand upon reading this discloser that a pilot of an aircraft can user-configure these displays to provide a wide variety and arrangement of different flight information data presentations and navigational perspectives according to the teachings this application, as well as those applications cross referenced above. Again, as one of ordinary skill in the art will understand upon reading this disclosure, in some embodiments the flight information data is dependent on a given aircraft type.

Figure 3:
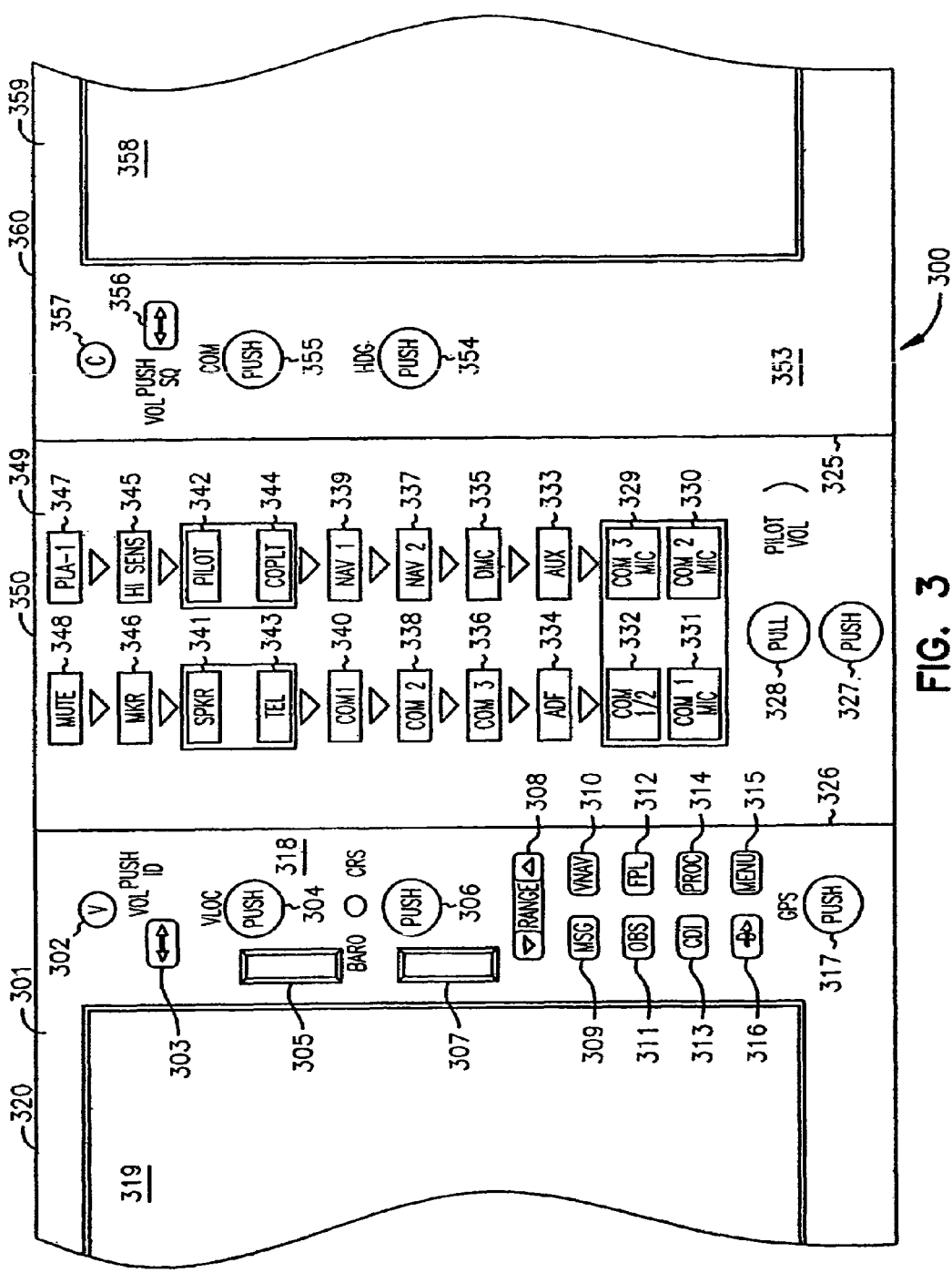
FIG. 3 illustrates an embodiment of a cockpit instrument system, having customizable, navigation related, flight information data display capabilities, according to the teachings of the present invention.

FIG. 3 illustrates another embodiment of a cockpit instrument system 300 according to the teachings of the present invention. As shown in FIG. 3, one embodiment of the cockpit instrument system 300 of the present invention includes a first instrument panel 320 having a first bezel 301 with one or more controls (e.g., 302-317) affixed to the first bezel 301. In the embodiment of FIG. 3, the first bezel 301 also surrounds a first display 319 which is operable to present airspeed, attitude, altitude, heading and navigation related, flight information data as well as control and equipment data associated with the controls (e.g., 302-317) and other equipment or sensors of the aircraft. The system 300 includes a second panel 360 having a second bezel 359 with one or more additional controls (e.g., 354-357) affixed on the second bezel 359. Moreover, the second bezel 359 surrounds a second display 358 which is operable to present airspeed, attitude, altitude, heading and navigation related, flight information data as well as control data and equipment data associated with the additional controls (e.g., 354-357) and other equipment or sensor of an aircraft.

In the embodiment shown in FIG. 3, system 300 includes an audio control panel 350 having an audio bezel 349 with one or more audio controls (e.g., 327-348) affixed on the audio bezel 349. In the embodiment shown in FIG. 3, the audio control panel 350 includes a vertically oriented audio control panel 350 positioned between two side by side MFDs, e.g. 320 and 360. The audio controls (e.g., 327-348) are operable to provide control of audio capabilities to the pilot. In some embodiments, a first side of 318 of the first bezel 301 is parallel and proximate to a first side 326 of the audio bezel 349. Further, a second side 325 of the audio bezel 349 is parallel and proximate to a first side 353 of the second bezel 359. As one of ordinary skill in the art will understand upon reading this disclosure, in this system level embodiment of FIG. 3, three independent panels (e.g., 320, 350, and 360) are economically arranged to permit an operator's (e.g., pilot's) fingers on a single hand to simultaneously access one or more controls (e.g., 302-317) of the first bezel 301, one or more controls (e.g., 327-348) of the audio bezel 349, and one or more controls (e.g., 354-357) of the second bezel 359.

As is readily apparent to those skilled in the art, this arrangement of system 300 permits optimal access to controls and displays in a centralized fashion within the cockpit. Correspondingly, a pilot can readily access and obtain information needed during flight without requiring the use of alternate hands or having to move his/her eyes in multiple and sometimes opposite locations within the cockpit.

According to the teachings of the present invention, each of the MFDs, e.g. 320 and 360, in system 300 include the full redundant, or backup, flight information data display capabilities. And, each of the MFD's, e.g. 320 and 360, in system 300 are variably configurable to provide a wide variety and arrangement of different flight information data presentations and navigational perspectives according to the teachings this application.

In one embodiment of the present invention, MFD 320 includes a PFD 320 such as explained and described in detail in connection with FIGS. 1A-1D. In this embodiment, MFD 360 includes a NAV display 360 such as explained and described in detail in connection with FIGS. 2A-2C. As stated above, both PFD 320 and NAV display 360 are adapted to provide customizable, navigation related, flight information data presented on their respective displays, e.g. 319 and 358. In the invention, both displays, 319 and 358 are dynamically configurable, such as by actuating overlay controls (such as softkeys 114 as shown in FIG. 1A), or other control inputs (described herein), proximately located on the respective bezel of the PFD 320 and NAV display 360. As discussed and described in detail in connection with FIGS. 1A-2C, the overlay controls (such as softkeys 114 as shown in FIG. 1A) can be used to create or add additional navigation related, flight information data as display insets (e.g. 150 in FIG. 1A) and/or as graphical information overlays (e.g. 160, 170, 180 and 190 in FIG. 1A) on displays 319 and 358. The invention is not so limited. And, as described above, any such display insets and/or graphical information overlays are independently or collectively configurable.

In some embodiments of system 300, a separate color is used to represent different information presented on displays 319 and 358. In this way, customized insets within the displays (e.g., 319 or 358) are readily identified as pilot configured information, and navigation related, flight information data is readily distinguished. Moreover, in some embodiments, messaging controls operable to permit messaging capabilities are located on one or more of the bezels (e.g., 301, 349, or 359).

Figure 4:
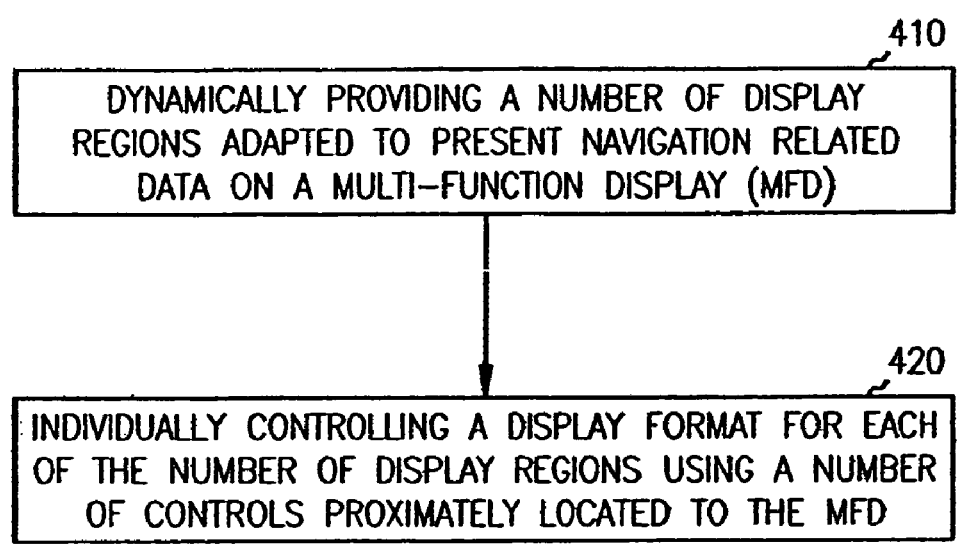
FIG. 4, is a diagram of one method embodiment for a customizable display of navigation related, flight information data according to the teachings of the present invention.

FIG. 4 illustrates a method for providing navigation related, flight information data according to the teachings of the present invention. As will be understood by one of ordinary skill in the art upon reading the present disclosure, the methods of the present invention are performed using the devices and systems described above in connection with FIGS. 1A-3. As shown in FIG. 4, the method includes dynamically providing a number of display regions, adapted to present navigation related data, on a multifunction display (MFD) in block 410. According to the teachings of the present invention, the method further includes individually controlling a display format for each of the number of display regions using a number of input controls proximately located to the MFD in block 420.

In one embodiment, dynamically providing a number of display regions adapted to present navigation related data on a multifunction display (MFD) includes providing a first display region which includes a primary display region having a geographical data presentation filling the entire first display region and a heading indicator directly thereon, and providing a second display region which includes a number of insets overlaid on the primary display region. In one embodiment, dynamically providing a number of display regions, adapted to present navigation related data, on multifunction display (MFD) includes providing at least one display region having navigation related data in a cockpit perspective view. In this embodiment, the at least one display region includes an aircraft nose marker, a set of aircraft wingtip markers, a horizon line, and a number of geographic features. And, the method further includes dynamically configuring the at least one display region such that the display region illustrates a dynamic motion of the aircraft wingtip markers and the nose marker relative to the horizon line and the other geographical features while the horizon line is maintained in a fixed parallel orientation with a top of the MFD. Alteratively, the method further includes that the at least one display region can be operated on to provide a dynamic display showing the aircraft wingtip markers and nose marker maintained in a fixed parallel orientation with a top of the first MFD and the horizon line and other geographical features dynamically moving in relation to the aircraft wingtip marker and the nose marker.

In one method embodiment according to the teachings of the present invention, individually controlling a display format for each of the number of display regions using a number of input controls proximately located to the MFD includes dynamically and simultaneously providing a number of different display formats in each of the number of display regions. In one embodiment, dynamically and simultaneously providing a number of different display formats in each of the number of display regions includes dynamically providing a number of different displays selected from the group consisting of a perspective view, a top down view, an instrument view, and a birds-eye view.

In one method embodiment according to the teachings of the present invention, the method includes dynamically swapping a display format provided in one of the number of display regions with a display format provided in another one of the number of display regions. Further, in one embodiment, dynamically providing a number of display regions, adapted to present navigation related data, on multifunction display (MFD) includes providing at least one display region having a dynamic image associated with at least one of a weather condition, a terrain condition, and a traffic condition.

As one of ordinary skill in the art will understand upon reading this disclosure, the methods of the present invention can be described in the context of computer-executable instructions, such as program modules, being executed by a computer. Generally, program modules include routines, programs, objects, components, data structures, etc. that perform particular tasks or implement particular abstract data types.

As one of ordinary skill in the art will understand upon reading and comprehending this disclosure, any one or more of the above features can be combined into a particular embodiment of the invention. Likewise, in the invention any one or a combination of the above functions can be optionally de-activated in the device. One of ordinary skill in the art will further understand that the method includes using a computer accessible medium having a set of computer executable instructions operable to perform the method. Other embodiments may be utilized and structural, logical, and electrical changes may be made without departing from the scope of the present invention.

In some embodiments, the methods provided above are implemented as a computer data signal embodied in a carrier wave or propagated signal that represents a sequence of instructions which, when executed by a processor, cause the processor to perform the respective method. In other embodiments, methods provided above are implemented as a set of instructions contained on a computer-accessible medium capable of directing a processor to perform the respective method. In varying embodiments, the medium includes a magnetic medium, an electronic medium, or an optical medium.

The system of the present invention includes software operative on a processor to perform methods according to the teachings of the present invention. One of ordinary skill in the art will understand, upon reading and comprehending this disclosure, the manner in which a software program can be launched from a computer readable medium in a computer based system to execute the functions defined in the software program. One of ordinary skill in the art will further understand the various programming languages which may be employed to create a software program designed to implement and perform the methods of the present invention. The programs can be structured using C programming language or other high level language and assembly. However, as will be appreciated by one of ordinary skill in the art upon reading this disclosure, the teachings of the present invention are not limited to a particular programming language or environment.

CONCLUSION

The above cockpit instrument panels, systems and methods have been described, by way of example and not by way of limitation, with respect to improving pilot driven controls and pilot delivered information. That is, the instrument panels, systems, and methods provide for better integrated control, access, and presentation of flight information within the cockpit. A cockpit instrument system is provide which affords a customizable presentation of navigation related, flight information data on a multifunction display (MFD). The MFD includes a bezel having controls located thereon which are adapted for controlling display formats, communication devices, navigational devices, and equipment sensors. A display is located adjacent to the bezel. The display is adapted to include a number of display regions having navigation related data. According to the teachings of the present invention, a first and a second display format, having the same or different vantage points or views for navigation related, flight information data are provided simultaneously on display. For example, a first display format for navigation related, flight information can be provided in a primary display area of display and a second display format for navigation related, flight information data being provided as a display inset thereon. At least one of the controls is operable to variably select a display format for the number of display regions. According to various embodiments of the present invention, a geographical data presentation fills the entire display and a partial compass rose or a full horizontal situation indicator is selectably, directly overlaid on the geographical data presentation.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices and methods are used. The scope of the invention should be determined with reference to the appended claims, along with the full scope of equivalents to which such claims are entitled.

What is claimed is:

1. A cockpit instrument system, comprising:
    a display including a primary display region and an inset overlaid on top of the primary display region, the display operable to-
       present a full-screen cockpit perspective view filling the primary display region, and
       present a top down navigational view within the inset simultaneously with the presentation of the cockpit perspective view within the primary display region; and
    a control, coupled with the display, operable to switch the views on the display in response to operation by a user such that the top down navigational view is presented within the primary display region and the cockpit perspective view is presented within the inset.

2. The system of claim 1, further including a multifunction display (MFD) operable to simultaneously provide a plurality of navigation related views, wherein the display and the MFD are operable to dynamically interchange at least one of the views presented on each of the displays.

3. The system of claim 2, wherein the control is positioned on a bezel surrounding at least one of the displays.

4. The system of claim 2, wherein the control is positioned on an audio instrument panel positioned between the displays.

5. The system of claim 1, wherein the display is further operable to present an instrument view or a birds-eye view within at least one of the primary display region and the inset.

6. The system of claim 1, wherein the display is further operable to selectively overlay flight information on the cockpit perspective view presented within the primary display region.

7. The system of claim 6, wherein the flight information includes a partial compass rose or a full horizontal situation indicator.

8. A cockpit instrument system, comprising:
    a primary flight display (PFD) including a primary display region and an inset, the PFD operable to-
       present a cockpit perspective view within the primary display region,
       present a top down navigational view within the inset simultaneously with the presentation of the cockpit perspective view within the primary display region, and
       switch the views in response to a user input such that the top down navigational view is presented within the primary display region and the cockpit perspective view is presented within the inset; and
    a multifunction display (MFD) operable to simultaneously provide a plurality of navigation related views,
    wherein the PFD and MFD are operable to dynamically interchange at least one of the views presented on each of the displays.

9. The system of claim 8, further including a control operable to switch the views of the PFD in response to operation by a user.

10. The system of claim 9, wherein the control is positioned on a bezel surrounding at least one of the displays.

11. The system of claim 9, wherein the control is positioned on an audio instrument panel positioned between the displays.

12. The system of claim 8, wherein the PFD is further operable to present an instrument view or a birds-eye view within at least one of the primary display region and the inset.

13. The system of claim 8, wherein the PFD and MFD are each operable to present at least one dynamic image associated with a weather condition, a terrain condition, or a traffic condition.

14. The system of claim 8 wherein the PFD is further operable to selectively overlay flight information on the cockpit perspective view presented within the primary display region.

15. The system of claim 14, wherein the flight information includes a partial compass rose or a full horizontal situation indicator.

16. A cockpit instrument system, comprising:
    a display including a primary display region and an inset overlaid on top of the primary display region, the display operable to-
       present a full-screen cockpit perspective view filling the primary display region, the cockpit perspective view including an airspeed indicator and an altitude indicator, and
       present a two-dimensional map view within the inset simultaneously with the presentation of the cockpit perspective view within the primary display region, the inset being overlaid on the primary display region such that the airspeed and altitude indicators are not obstructed by the two-dimensional map view inset; and
    a control, coupled with the display, operable to cause removal of the inset from the display in response to operation by a user.

17. The system of claim 16, wherein the cockpit perspective view includes a full-screen attitude indicator substantially filling the primary display region.

18. The system of claim 16, where the control is further operable to change the content of the inset in response to operation by the user.

19. The system of claim 18, wherein, in response to operation by the user, the control is operable to overlay weather information on the two-dimensional map.

20. The system of claim 18, wherein, in response to operation by the user, the control is operable to overlay air traffic information on the two-dimensional map.

21. The system of claim 16, wherein the inset comprises less than twenty-five percent of the primary display region.

22. The system of claim 21, wherein, in response to operation by the user, the control is further operable to remove at least one of the airspeed indicator and the altitude indicator from the primary display region.

* * * * *